United States Patent [19]

Taylor

[11] 4,424,530

[45] Jan. 3, 1984

[54] LOG SURFACE DETERMINATION TECHNIQUE

[75] Inventor: Wilson E. Taylor, Palm Bay, Fla.

[73] Assignee: Harris Corporation, Melbourne, Fla.

[21] Appl. No.: 303,138

[22] Filed: Sep. 17, 1981

[51] Int. Cl.$^3$ ............................................. H04M 7/00
[52] U.S. Cl. ..................................... 358/96; 364/572; 364/604; 358/106; 358/282; 382/9
[58] Field of Search ................... 358/93, 96, 106, 280, 358/282; 382/5, 8, 9, 50, 54; 364/475, 572, 577, 604

[56] References Cited

U.S. PATENT DOCUMENTS

| | | | |
|---|---|---|---|
| 4,183,013 | 1/1980 | Agrawala et al. | 382/9 |
| 4,201,977 | 5/1980 | Shimizis | 382/54 |
| 4,296,405 | 10/1981 | Rich | 382/8 |
| 4,334,274 | 6/1982 | Agui et al. | 382/9 |

OTHER PUBLICATIONS

E. C. Jacobson et al., "Algorithm for Checking Shapes in Large-Scale Integration Layouts", IBM Technical Disclosure Bulletin, vol. 18, No. 6, Nov. 1975, pp. 1881–1884.

*Primary Examiner*—Tommy P. Chin
*Assistant Examiner*—Edward L. Coles
*Attorney, Agent, or Firm*—Antonelli, Terry & Wands

[57] ABSTRACT

A log surface determination technique involves optically measuring a tree stem and accurately separating the image of the tree stem from adjacent background, determining the true surface of the stem, eliminating discontinuities or anomalies, and identifying the ends of the stem, thereby making more accurate the definition of diameter measurement planes and more accurate edges or sides of the stem for permitting a more precise evaluation of the tree stem to obtain optimal board feet yield. The tree stem is optically scanned to produce data representative of a series of adjacent optical slices through the stem, with successive optical slices of the tree stem being aligned with one another to produce a composite picture of the surface of the stem which may include a number of edges containing both the size of the stem and anomalies such as branch stubs, bark chips, etc. Through a refinement algorithm, employing an X-shaped filter, the existence of a true edge or side of the stem can be identified as contrasted to anomalies which would otherwise produce erroneous data for subsequent tree stem evaluation. Through this filtering process, once the anomalies are removed, gaps in the outline of the tree stem which result from the filtering process are filled in by an interpolation procedure based upon adjacent portions of the stem edges.

11 Claims, 13 Drawing Figures

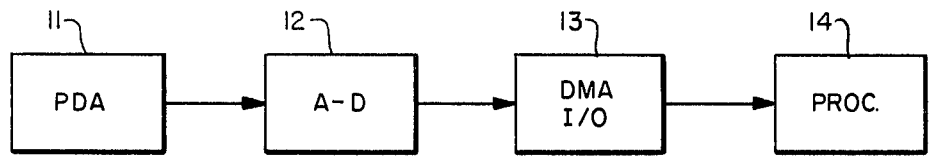
FIG. 1.
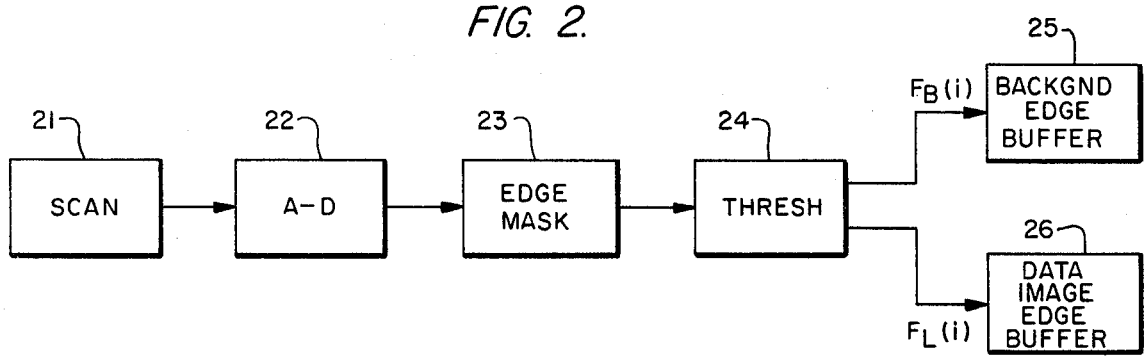
FIG. 2.
FIG. 3.
| X-4 | -1 |
| X-3 | -1 |
| X-2 | -1 |
| X-1 | -1 |
| X | 8 |
| X+1 | +1 |
| X+2 | +1 |
| X+3 | +1 |
| X+4 | +1 |
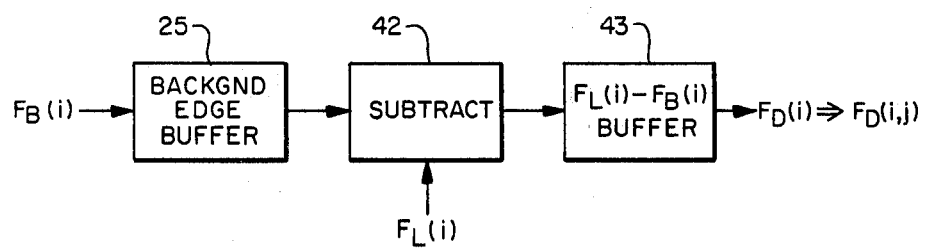
FIG. 4.
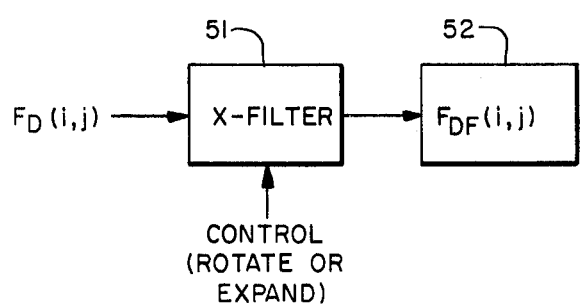
FIG. 5.

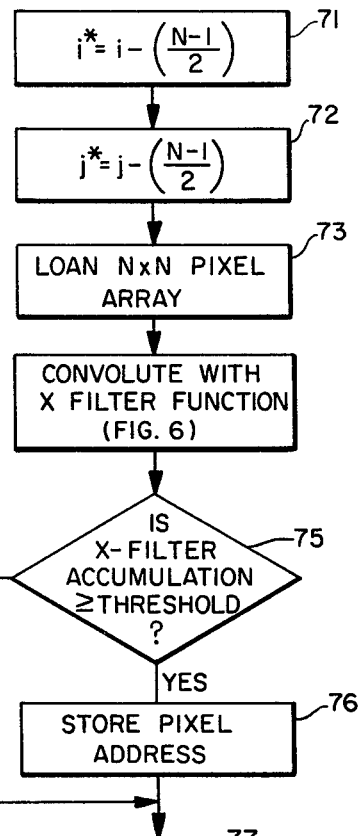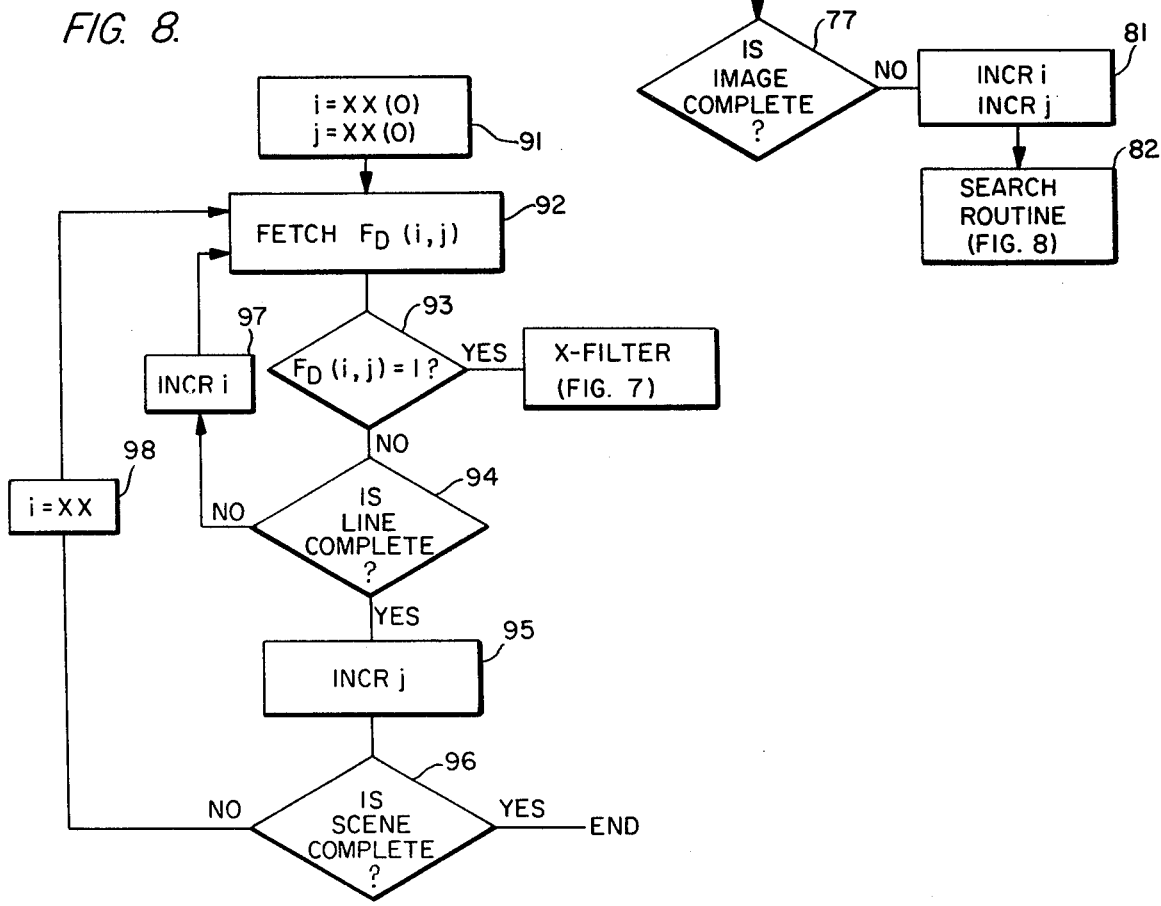

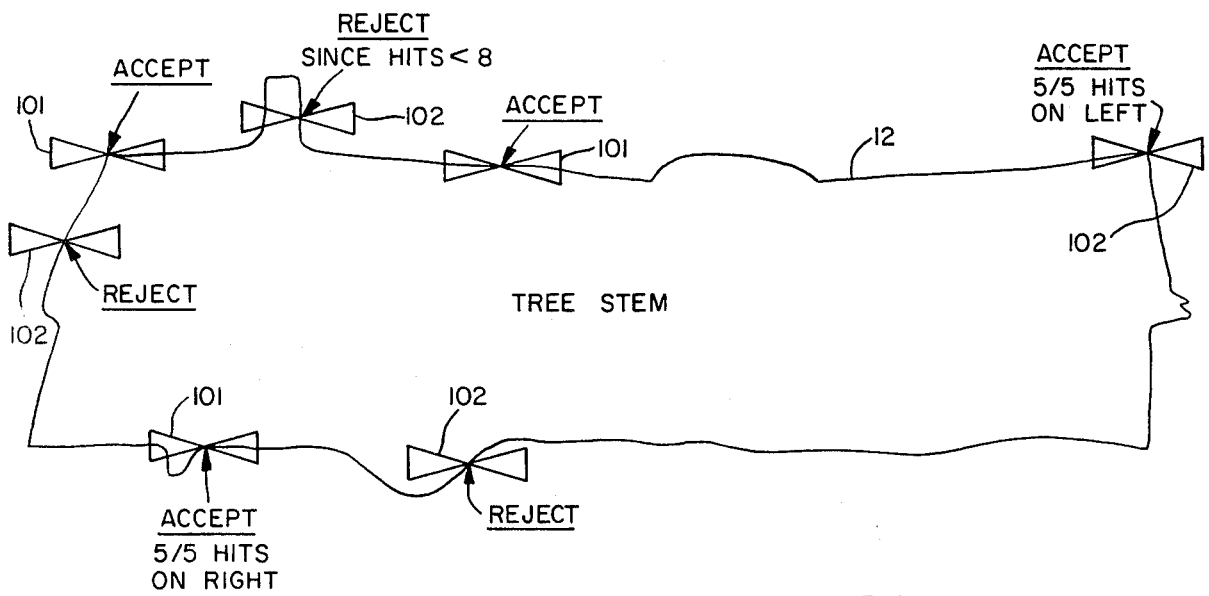
FIG. 9.
FIG. 11.
FIG. 10.
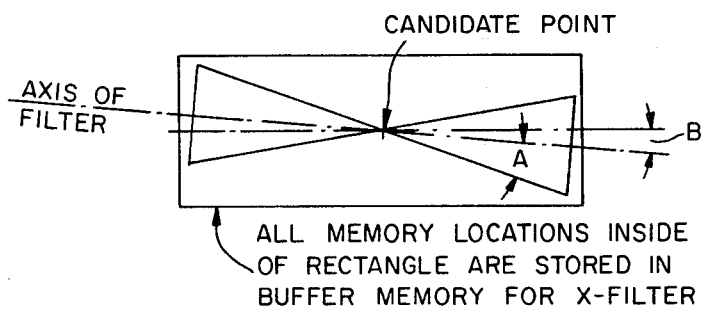
FIG. 12.
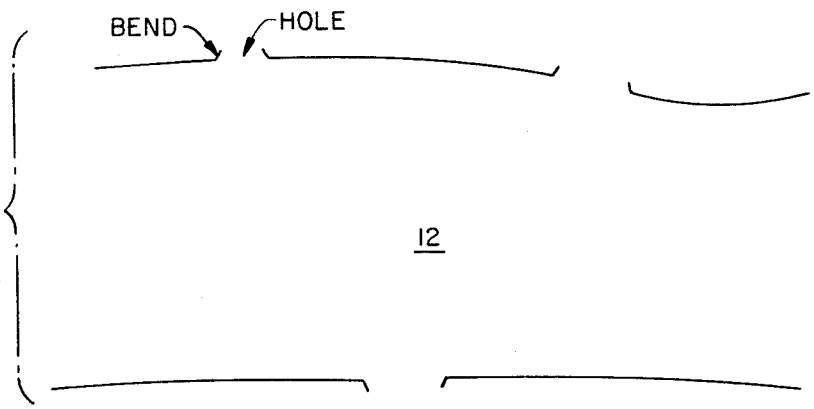
FIG. 13.

LOG SURFACE DETERMINATION TECHNIQUE

FIELD OF THE INVENTION

The present invention is directed to optical measurement systems and is particularly directed to a scheme for isolating the image of the actual surface of the log from the visual clutter of chips, bark, and branch stubs by a processor-implemented scheme for reducing large quantities of raw image data into refined tree stem outline data.

In copending application Ser. No. 303,136, filed, Sept. 17, 1981 entitled "Focus Compensation Linkage", by Warren H. Miller, Jr. there is described an optical scanning system for conducting optical measurements on a workpiece or object, particularly a tree stem in a sawmill environment, from a remote location. The optical measurement system includes an optical scanner which rotates about an axis orthogonal to the tree stem and produces, from a rectilinear photodiode array, successive optical slices or images through the tree stem during rotation of the scanner. In copending application Ser. No. 303,181, filed Sept. 17, 1981 entitled "Reference Marker/Correlation Scheme for Optical Measurements", by Warren H. Miller, Jr. and Wilson E. Taylor, there is described a scheme for providing an optical measurement reference to be used in conjunction with a scanning system, for example the type described in the former referenced copending application, that enables successive optical slices or rectilinear images of a workpiece or object, particularly a tree stem within a sawmill environment, to be aligned with one another, thereby facilitating subsequent processing of the image of the object or workpiece for physical characteristic evaluation. Each of the above-identified applications is assigned to the assignee of the present application.

The inventions described in these applications, as well as the present invention, deal with problems attendant to optical measurement systems disposed within a highly noisy image processing environment, such as is found in a sawmill, where the optical detector that is used for obtaining log measurement data is subject to a considerable amount of vibration or motion relative to the log bed upon which the workpiece of interest, namely, the tree stem is disposed.

One of the important pieces of data that is useful for obtaining optimal board feet yield, namely, for optimizing the manner in which the log is to be cut or sectioned into individual lumber pieces, is its centroid and straightness or sweep. Conventional approaches to determining these parameters involve scanning systems that simply report the instantaneous apparent diameter issued from a remote station or a local station back to a computer.

Unfortunately, this approach results in the feeding of erroneous data to the computer, since it does not take into account the presence of anomalies or discontinuities (considering the tree stem as a whole), such as chips, bark, branch stubs, etc. Namely, in conventional log analysis data processing operations, no attempt is made to smooth the data prior to feeding it to the computer. This results in increased evaluation calculations that are far from optimal, since the data is not smoothed prior to computer analysis whereby an often inaccurate data representation of the tree stem and corresponding inaccurate stem cutting maps are produced.

SUMMARY OF THE INVENTION

In accordance with the present invention, the drawbacks of the conventional approach of simply reporting the instantaneous apparent diameter of the tree stem to the log processing computer are overcome by a scheme which optically measures the tree stem and accurately separates the image of the tree stem from adjacent background, determines the true surface of the stem, eliminating discontinuities or anomalies, and identifies the ends of the stem, thereby making more accurate the definition of diameter measurement planes and more accurate edges or sides of the stem for permitting a more accurate evaluation of the tree stem to obtain optimal board feet yield.

Pursuant in the present invention, the tree stem is optically scanned to produce data representative of a series of adjacent optical slices through the stem, with successive optical slices of the three stem being aligned with one another to produce a composite picture of the surface of the stem which may include a number of edges containing both the size of the stem and anomalies such as branch stubs, bark chips, etc. Through a refinement algorithm, employing an X-shaped filter, (to be described in detail below), the existence of a true edge or side of the stem can be identified as contrasted to anomalies which would otherwise produce erroneous data for subsequent tree stem evaluation. Through this filtering process, once the anomalies are removed, gaps in the outline of the tree stem which result from the filtering process are filled in by an interpolation procedure based upon adjacent portions of the tree edge.

As a result of this processing technique, a large number of apparent edges of the tree stem are eventually reduced to top and bottom edges corresponding to the two sides of the tree stem and the position of the stem relative to a fixed location on the log bed can be accurately determined, so that a true measurement of the diameter of the stem can be carried out from the remote optical scanning station and attendant processing equipment.

Advantageously, the present invention may preferably employ the rotational optical scanner and reference-marker/correlation schemes disclosed in the above-referenced copending applications.

BRIEF DESCRIPTION OF THE DRAWINGS

FIG. 1 is a general block diagram of a log surface measurement system;

FIG. 2 is a functional block diagram of initial edge data processing steps carried out by the system of FIG. 1 prior to slice alignment;

FIG. 3 shows a portion of an optical slice or pixel line for application to a Lapacian coefficient multiplier function;

FIG. 4 is a functional block diagram of a background elimination process;

FIG. 5 is a functional block diagram of stem edge refinement using an X-filter;

FIG. 6 is a digital matrix representative of an X-filter;

FIG. 7 is a flow chart of an X-filter convolution process;

FIG. 8 is a flow chart of the search routine of step 82 of FIG. 7;

FIG. 9 shows the application of the X-filter to a tree stem outline;

FIG. 10 shows the application of the X-filter to an area of image noise;

FIG. 11 shows an enlarged portion of FIG. 9 to which the X-filter is applied;

FIG. 12 shows pictorially the storage of an X-filter is memory; and

FIG. 13 shows exemplary holes and bends in an X-filtered stem outline.

DETAILED DESCRIPTION OF THE INVENTION

As was mentioned previously, the present invention preferably employs the optical scanning system and reference marker alignment/correlation scheme respectively disclosed in the above-referenced copending applications assigned to the assignee of the present application. In accordance with the operation of the optical scanning system described in the former application, from one or more remote optical scanning stations which rotate about respective axes orthogonal to the effective linear axis of the tree stem, successive optical slices through the tree stem and adjacent background are obtained from a rectilinear photodiode array. This array effectively may generate on the order of 1,024 pixels of information representative of a narrow optical slice which contains not only successive shades of grey of the stem itself, but discontinuities, e.g. edges, bark chips, background, etc. As is described in the latter of the above-two-referenced copending applications, the successive optical slices may be aligned with one another by providing a reference marker comprised of a set of randomly arranged highly reflective and absorptive stripes or marks which extend along the length of the log bed, so as to accommodate the field of view of any stem to be processed. Within attendant processor memory there is stored data corresponding to a mathematical image of this reference marker the position of which on the log bed is absolutely known and which is absent other extraneous data, such as a tree stem. The pixel outputs from the photodiode array are digitized and then compared on an optical slice-by-optical slice, basis with the data corresponding to optical slices through the reference marker that is stored in memory, which correspond to the positions where the optical slices through the stem and adjacent background including the reference marker are taken by the optical scanner during its scan of the stem.

As is discussed in the latter application, during tree stem processing within a sawmill, there is considerable vibration between the optical scanning elements and the log bed upon which the tree stems are placed for measurement purposes. As the scanner scans the tree stem, the outputs of the photodetector are sampled, so that there is obtained a plurality of successively adjacent optical slice images through the tree stem and the adjacent background including the reference marker. As the instantaneous position of the sample for any particular optical slice may vary from one sample or optical scanning position to another, it is not simply a matter of stacking up the slices in order to obtain a useful picture of the tree stem. Rather, because of the vibration, if one attempted to carry out such a simplified procedure, one would have a far from accurate picture of the tree stem, thereby making a cutting map evaluation substantially impossible or extremely inaccurate.

Advantageously, pursuant to the scheme described in the latter application, a reference marker may be used to incrementally shift (in the vertical direction of the slice through the stem) the position of each optical slice through a respective adjacent portion of the tree stem until the reference marker portions of the image are aligned with one another. Once the reference marker portions of the image are aligned with one another, namely they are aligned with the reference marker stored in memory, it is guaranteed that those portions of the image slices representative of the tree stem are aligned.

Of course, as mentioned previously, this resultant aligned image will contain images of anomalies in the tree stem which need to be smoothed out before accurate board feet yield evaluation can be carried out by the log processing computer. The present invention is particularly directed to solving this problem, namely, that of removing the discontinuities in the resultant tree stem image.

Attention is now directed to FIG. 1 which shows an overall block diagram of the optical processing/signal evaluation scheme in accordance with the present invention. The components of the system are shown in a simplified block diagram format since the details of the individual devices are either known or described in the above-referenced copending applications and do not require further explanation here. The description of the invention to follow will focus upon the signal processing operations that are carried out in order to refine the initial image of the tree stem to a point where more accurate data for eventual merchandizing processing can be conducted. As shown in FIG. 1, the scanning optics includes a rectilinear photodiode array 11, such as that described in former application contained within the rotational optical scanner, the outputs of which are coupled to an analog to digital converter 12 and sampled periodically as the optical scanner sweeps along the tree stem of interest that is positioned on the log bed. At the same time that the image of an individual tree stem slice is obtained, there is a slice through the reference marker disposed adjacent to the tree stem, as described in the latter of the above-referenced copending applications. This data, namely that including both the reference marker image and the tree stem is coupled through a conventional direct memory access input output unit 13 to designated random access memory within processor 14. Processor 14, as is customary, in addition to the random access memory, includes read only memory and a central processing unit interconnected with one another through address, data and control bus communication links. The read only memory is preferably programmed in accordance with the signal evaluation schemes to be described below and illustrated in the flow charts in the accompanying drawings, so as to permit the central processing unit to refine the data representative of the tree stem to a point where the tree stem is effectively smoothed down to its opposite edges, thereby facilitating further processing by the merchandizing computer. It should also be noted here that the manner in which the tree stem is to be sliced and the algorithm for obtaining a cutting map for the stem of interest are outside the scope of the present invention and may be any one of a number of presently known lumber processing schemes. The description to follow is addressed, instead, to the manner in which the initial image of the tree stem may be filtered through the novel signal processing scheme described herein, thereby permitting the log processing computer to carry out a more accurate board foot yield evaluation.

In the above-described copending application entitled "Reference Marker/Correlation Scheme for Optical Measurements", the correlation scheme employed is described as comparing streams of binary data (data for each pixel is eventually reduced to a binary format) through a thresholding process. In that application it is mentioned that prior to the thresholding, an edge mask data reduction scheme may be employed and, in accordance with the present invention, such a scheme is preferably used in order to reduce the various shades of grey for each pixel, as represented by the output of the analog-to-digital converter, to a one bit format.

FIG. 2 is a functional block diagram of the signal processing to be conducted in accordance with the present invention for initially obtaining reference data and actual image data of the optical slices through the stem and the reference marker, which essentially correspond to that obtained in the scheme described in the above-referenced application.

More specifically, as the optical scanner rotates, successive samples of the photodetector array output are produced and digitized by analog-to-digital converter 22 and this data is stored in memory in the processor. The digitized data is effectively refined through an edge mask processing scheme in which each pixel is correlated with adjacent pixels to determine whether or not that particular pixel is an edge, namely there is a substantial discontinuity in detected optical intensity at a respective photodiode.

For a photodetector array of 1,024 pixels, and a quantizing accuracy of 6 bits, there will be 1,024 pixels producing data words representative of up to 64 different shades of grey. The edge mask 23 may be implemented to a running correlation of the data representative of the output of each pixel with that of the 4 pixels above the pixel of interest and that of the 4 pixels below the pixel of interest.

More particularly, referring to FIG. 3, there is shown a portion of a pixel memory which stores the successive 1,024 data words representative of the various shades of grey obtained for each pixel for a particular optical slice. At some pixel X within the 1,024 pixels, the data for the shade of grey of this pixel and its adjacent 8 pixels and modified by a Laplacian coefficent multiplier function. For each of the 4 pixels $x-1 \ldots x-4$ preceeding the pixel X of interest, the data word representative of the respective shade of grey is multiplied by $-1$, whereas for the pixel of interest, its value is multiplied 8. For the subsequent or next group of four pixels $x+1 \ldots x+4$, the data value representative of the respective shade of grey of each pixel is multiplied by $-1$, as were the immediately precedent 4 pixels. The resultant values are accumulated and compared with a prescribed threshold in step 24 (FIG. 2). If the threshold is exceeded, the pixel of interest is considered to be an edge of a 1 is stored in an edge memory (25 or 26) for that pixel. If the threshold is not exceeded, the pixel is considered not to be an edge and a 0 is stored for that pixel. This procedure is carried out for all 1,024 pixels of interest with first 4 pixels and the last 4 pixels being discarded or truncated since the coefficient multiplying function is invalid at these end points.

This procedure permits the successive shades of grey produced by the analog-to-digital conversion 22 to be converted into a substantially reduced member of edge points through the coefficient multiplying and accumulation edge mask function 23 and the thresholding procedure 24.

Steps 25 and 26 of FIG. 2 represent the storage of the reference marker pixel data (edges) and the image of the tree stem plus the reference marker edges as described in the above-referenced copending application entitled "Reference Marker/Correlation Scheme for Optical Measurements".

Once these two set of edges have been stored in memory, they are correlated with one another in accordance with the correlation scheme described in the above-referenced application, so that the successive images of the optical slices, here images of edges within the optical slices, are aligned with one another.

With the successive images or optical slices (now represented by data stored in memory) aligned with one another, there is contained within the RAM of the processor a matrix or array of edge data corresponding to the tree stem including anomalies within the stem and the reference marker and adjacent background. In order to separate the stem image from the background, a subtraction process illustrated in FIG. 4 is conducted. For each optical slice (delineated by a parenthetical i) the respective binary data for each pixel of that slice (the individual pixel being designated by a parenthetical j), is subtracted from the corresponding reference data for that slice stored in the background edge buffer. FIG. 4 shows this process, where an individual optical slice from the background buffer $F_B(i)$ is subtracted from the image data for the particular optical slice of interest which includes both the reference marker and the tree stem, $F_L(i)$, and the resultant quantity is stored in a buffer 43. The difference between the optical slice image of the stem plus the background and that of the background alone leaves only the stem edges of interest, corresponding data $F_D(i)$ for which is stored in a designated difference memory section of RAM within the processor.

Once the difference image has been formed between the edge scene without the stem and edge scene with the stem present, the procedure in accordance with the present invention conducts an "X"-filtering operation in order to determine where the stem outline is and what extraneous details must be rejected. The "X" filter selects or rejects each point of the edge image by examining each piece of pixel data stored in the edge difference memory and comparing its neighboring points. A block diagram of the procedure to be carried out is shown in FIG. 5 wherein the "X" filter 51 is coupled to receive the difference values stored in memory or a buffer obtained from the subtraction process discussed above in conjunction with FIG. 4. Basically, the "X" filter operates to eliminate high frequency noise and background subtraction error by identifing the most likely stem elements. The filter will also eliminate feathers and branches protruding from the stem and it can be implemented as an NxN convolutional filter shown in FIG. 6.

As shown in FIG. 6, the filter may be represented by a multiply/accommodate NxN matrix, where N=7, the filter is comprised of a portion of memory storing binary data here "1"s configured in the shape of an "X". For each data point within the difference buffer, corresponding to the refined pixel data for the composite image of the aligned optical slices of the tree stem, the filtered image $F_{DF}$ (ij) may be calculated as $F_{DF}(i,j) = F_D(i,j) * F_X(i,j) = T_{HIT\ i,j}$ where $T_{HIT}$ is the hit threshold for a possible stem element. Thus, for each pixel point of interest (on which the X-filter is centered) the "X filter" simply counts the number of hits inside the "X" and declares a candidate point to be an edge point on the stem if some prescribed number out of a total available number of hits occur, for example eight out of ten hits occur. If some other number, for example 7 or less hits out of ten occur, the candidate point is declared a non-stem-edge and is erased from memory. In this manner, long horizontal lines are saved and all other short horizontal lines as well as other lines in a non-horizontal direction are rejected. As a result, all small shaped objects are rejected, as well as chips, burrs, bumps etc. on the stem.

A flow chart of the X-filter operation is shown in FIG. 7. The pixel of interest is located in the center of the X filter, in the illustration of FIG. 6 having a 7×7 configuration. To begin the convolution process, at the upper left hand corner, a location in memoryy i*j* is defined. In step 71, i*=i−(N−1)/2 and in step 72 j*=j−(N−1)/2. In step 73, an NxN pixel array is loaded and then in step 74 this array is convolved with X-filter shown in FIG. 6 in accordance with the equation set forth above. In step 75, the accumulated value of the convolution equation is compared with a threshold which is determined empirically. If the threshold is equal to or exceeded, the pixel of interest is considered to be a stem candidate and its address is stored in memory in step 76. Step 77 then questions whether or not the image is complete and, if so, the process has come to an end. Otherwise, the pixel location is incremented in step 81 and a search routine shown in FIG. 8 to be described below is conducted.

If the result of the convolution of the pixel location with the convolution filter did not equal to or exceed the threshold in step 75, the pixel location of interest is considered not to be a stem candidate and the value for the pixel location is set at 0 in step 83. The routine then proceeds to step 77 referenced above.

The search routine is shown in FIG. 8. Initially, the location of interest (i,j) is identified in step 91 and the difference value from the difference buffer obtained as shown in FIG. 4 is fetched in step 92. This value is then compared with the binary value 1. If the point of interest is a 1, it is considered to be a candidate for the X-filter and the X-filter process shown in FIG. 7 is conducted. Otherwise, it is questioned whether or not the line of interest is complete, namely, the pixel location for each respective optical slice of which the composite of the tree stem is formed has been evaluated. If not, the i value is incremented in step 97 and a new difference value for the same row position but different column location is derived in step 92 and the foregoing process is repeated. Once the line is complete, j is incremented in step 95 and step 96 queries whether or not the scene, namely, the composite of the optical slices, has been completely processed. If the image has been completely processed, then the entire tree stem image has been processed and any discontinuities or anomalies have been converted into gaps. Otherwise, a new location is selected step 98 and the process is begun anew.

FIG. 9 illustrates the manner in which the X-filter operates on the tree stem image stored in memory, with the acceptance of a candidate on the upper or lower edge being identified by an accept designation 101 and a rejection of the proposed candidate being identified by the "REJECT" designation 102.

FIG. 10 illustrates how a candidate may be rejected for the application of the X-filter at positions 121 and 122 where noise or bark is included on the image. The X-filter (a digital matrix representative of which is shown in FIG. 6, described above), for a number of adjacent optical slices that are stacked together to form a composite within the pixel memory positions that make up the X-filter, is shown in FIG. 11.

FIG. 12 illustrates a slight modification of the X-filter for refining the operation of the stem smoothing process in accordance with the present invention. In order to detect the left or right hand ends of the stem, the "X"-filter will accept a candidate point as a stem edge if all four points to the right or left are hits. The width angle A as well of the main axis angle B (or tilt) of the "X"-filter can be controlled by obtaining from a memory a rectangular array of data shown in FIG. 12. With this data stored in memory, only the hits within the "X"-filter will be counted. All others will be simplied ignored. As a result, only one memory fetch is required for each candidate point even with the angles of the filter A and B varying.

During the search for edge points on the stem, it may be necessary to vary the angles A and B. For example, a small angle A will reject most chips, burrs, bumps, etc on the stem. A problem exists, however, if the stem is not horizontal at some point. If angle A is increased to accomoodate this non-horizontal direction of the stem, a greater number of chips, burrs, etc. will show up on the stem outline. A way to eliminate this problem of a non-horizontal stem outline when using a small angle of A is to search over several angles of B. For this purpose, the angle B may be allowed to assume a number of different values, for example 0°, +5,, −5°. If a candidate point is not declared an edge on the stem for some B value, a new value is employed until either the candidate point is accepted as an edge of the stem or all three B values have been employed. Once the X-filter has been applied to the edge image stored in memory, only the tree stem remains. As pointed out previously, and as represented by step 83 of the flow chart shown in FIG. 7, if a candidate is rejected, its value is set at 0. This results in holes in the stem at places where there were chips, burrs, bumps etc. and the X-filter will leave small bends on the stem at points where the X filter put holes. FIG. 13 illustrates the existence of such bends and holes in the resultant refined stem outline.

In order to fill in the holes, it is necessary to identify the top and bottom edge of the stem. If a search were carried out simply from top to bottom, it is not always true that both the upper and lower edges will appear on a given vertical column. This occurs for two reasons on the one hand, the column may pass through the hole or holes, and the left and right hand ends of the stem will not necessary line up vertically. In order to take these possibilities into account, it will be first assumed that the first edge from the top and bottom of the stem edge image are the true start of the top and the bottom. This assumption implies that the ends of the stem have no chips, burrs, etc.

In order to find the top/bottom of the stem, a search has begun at the extreme left hand column of the stem edge memory and the number of edge points are counted in each column. When an edge point is encountered, its location is stored in a buffer memory. This memory will contain the column number as well as the row (distance down from the top of the column). The buffer memory will also contain a memory word associated with each edge position to indicate the top or the bottom. Thus, the buffer memory stores the row and the column number of the edge or edges as well as the top or bottom identifier. In order to determine whether an edge is a top or a bottom edge, the search will note the first time that the two edges appear in a vertical column. The upper edge will be set as a top edge and the lower edge as a bottom edge. All edges to the left and the right of the first point are labeled top edges if they fall within a prescribed tolerance of the first top edge point and all edges will be set as bottom edges if they fall within a tolerance of the first bottom edge point. Tolerance may be a function of the maximum slope that the stem can have namely the maximum angle of the horizontal stem edge will deviate.

The left hand most edge point of the top of the bottom is then flagged and the same procedure is carried out for the right most edge point of the top and the bottom. The final part of the interpolation is simply connecting a straight line between the left most top and bottom to give the left edge of the end of the stem. The right edge is similarly with a straight line.

It is now possible to remove bends in the image by employing a "first difference" filter. The filter calculates the difference between adjacent edge points on the top (bottom) of the stem. If the difference or differences (second difference) exceeds a magnitude threshold, then the point must be a bend and is eliminated. This first difference filter is applied from left to right; if a bend is on the left side of a hole, it will be eliminated as just described. However, if the bend is on the right side of the hole, the process must look several edge points ahead and reject the bend point based upon the direction of the point just the right of the possible bend. Thus, the procedure removing the bends must look several points to the left or the right and reject a point as a bend based upon the direction of its surrounding points.

The final step in the procedure is to employ linear interpolation to fill in the holes created when the chips, burrs, bumps, etc. as well bends were removed. This interpolation is easily performed since each edge is labeled either top or a bottom. It is, of course, performed only between edges on the same surface, never between top and bottom. As a result, a complete outline of the stem has been found and is stored in buffer memory.

With the resulting refined image being stored, it is a simple matter for the merchandizing computer to find the diameter and centroids of the stem at prescribed intervals employing geometric correction due to the varying scan angles from the photodetector to the stem.

As will be appreciated from the foregoing description of the invention, initially raw data regarding the outline of a tree stem can be substantially smoothed in order that a more accurate physical characteristic evaluation for downstream merchandizing may be carried out. Through the use of a convolutional "X"-filter applied to prospective edge candidates, points along the stem which are not truly on the stem edge will be rejected while those on the stem edge will be retained. Once the rejected candidates have been deleted, the gaps resulting from the X-filter process are filled in through line interpolation techniques so as to obtain a final smooth representation of the successively stacked slices of the initial tree stem image. This greatly inhances the accuracy of stem processing calculations for merchandizing the lumber downstream.

As an additional feature, the reference marker need not be subtracted during the initial signal processing steps but may be retained in order to provide an accurate reference for locating the position of the stem on the log deck.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. A method of refining the image of an object so as to remove discontinuities in the image of the perimeter of said object, comprising the steps of:
    (a) providing a prescribed image filter which defines a delimited, predetermined-shape area of said image;
    (b) applying those portions of the image of said object having characteristics capable of defining the perimeter of said object to said filter, and eliminating from said image those portions which said filter establishes as not lying on said perimeter or as constituting discontinuities in said perimeter; and
    (c) selectively generating prescribed perimeter images at those portions of the image of said object which said filter has removed as constituting discontinuities in said perimeter;
whereby a complete image of the perimeter of said object absent discontinuities there is obtained.

2. A method according to claim 1, wherein said prescribed image filter is an X-shaped filter and step (b) comprises retaining those portions of the image of said perimeter which fall substantially within a selected portion of the area delineated by the X-shape of the filter.

3. A method according to claim 1, wherein said object comprises a tree stem and the perimeter of said stem constitutes the opposite edges of the stem.

4. A method of generating an image of the perimeter of an object absent discontinuities that may be contained in said perimeter comprising the steps of:
    (a) storing first data representative of an image of background of the scene in which an image of said object is to be generated;
    (b) optically scanning said object and generating second data representative of the images of successively adjacent sections of said object including background adjacent thereto;
    (c) modifying said second data so as to align the image of said successively adjacent sections of said object and background;
    (d) combining said first and second data so as to generate third data representative of the image of said object absent said background; and
    (e) filtering said third data with a filter that defines a delimited, predetermined-shape area of said image and modifying said third data so as to eliminate from said image those portions which said filter establishes as not lying on said perimeter or as constituting discontinuities in said perimeter.

5. A method according to claim 4, further comprising the step of:
    (f) selectively generating fourth data representative of prescribed perimeter images at those portions of the image of said object which said filtering step (e) has removed as constituting discontinuities in said perimeter, and combining said fourth data with said filtered third data, thereby obtaining fifth data representative of a complete image of the perimeter of said object absent discontinuities therein.

6. A method according to claim 4, wherein step (c) comprises, prior to modifying said second data, selectively masking said second data so that said second data is representative of apparent edges in said successively adjacent image sections of said object, whereby said modified second data is representative of the aligned images of apparent edges contained within successively adjacent sections of said object and background.

7. A method according to claim 4, wherein said filter effectively defines an X-shaped portion of said image and step (c) comprises retaining those portions of the image of said perimeter which fall substantially within a selected portion of the area delineated by the X-shape of the filter.

8. A method according to claim 7, wherein step (c) comprises, prior to modifying said second data, selectively masking said second data so that said second data is representative of apparent edges in said successively adjacent image sections of said object, whereby said modified second data is representative of the aligned images of apparent edges contained within successively adjacent sections of said object and background.

9. A method according to claim 8, wherein step (e) comprises counting those ones of said third data which represent apparent edges falling within said selected portion of the area delineated by the X-shape of the filter, and changing the value of a prescribed one of said third data representative of an apparent edge in response to the total of said count being less than a prescribed quantity.

10. A method according to claim 4, wherein step (e) further comprises adjusting said filter so as to controllably change the delimited, predetermined-shape, area defined thereby.

11. A method according to claim 9, wherein said object comprises a tree stem and the perimeter of said stem constitutes the opposite edges of the stem.

* * * * *